United States Patent [19]

Konno et al.

[11] Patent Number: 5,084,786
[45] Date of Patent: Jan. 28, 1992

[54] MAGNETIC TAPE MEMORY APPARATUS WITH AXIALLY DISPLACED HEADS ENABLING AFTER RECORDING AND VERIFICATION

[75] Inventors: Kazutoshi Konno, Tokyo; Hidehumi Goto; Hiroshi Chiba, both of Yokohama; Tohru Sampei, Naka, all of Japan

[73] Assignee: Hitachi, Ltd., Tokyo, Japan

[21] Appl. No.: 224,655

[22] Filed: Jul. 27, 1988

[30] Foreign Application Priority Data

Sep. 9, 1987 [JP] Japan .................. 62-223904
Sep. 24, 1987 [JP] Japan .................. 62-237115

[51] Int. Cl.$^5$ .................... G11B 27/08; G11B 5/584
[52] U.S. Cl. .......................... 360/13; 360/53; 360/77.14; 360/77.15
[58] Field of Search ............. 360/13, 14.1, 18, 19.1, 360/20, 27, 31, 32, 48, 53, 70, 73.09, 73.11, 77.14, 77.15, 61, 62, 64, 22, 23

[56] References Cited

U.S. PATENT DOCUMENTS

| | | | |
|---|---|---|---|
| 4,533,963 | 8/1985 | Nakano | 360/19.1 |
| 4,602,298 | 7/1986 | Nishitani et al. | 360/14.1 |
| 4,669,002 | 5/1987 | Nishioka et al. | 360/64 |
| 4,680,648 | 7/1987 | Takayama | 360/70 |
| 4,768,106 | 8/1988 | Ito et al. | 360/14.1 |
| 4,849,831 | 7/1989 | Hino | 360/14.1 |
| 4,860,125 | 8/1989 | van der Meer | 360/13 |

FOREIGN PATENT DOCUMENTS

| | | |
|---|---|---|
| 0110365 | 6/1984 | European Pat. Off. . |
| 0128577 | 12/1984 | European Pat. Off. . |
| 58-122606 | 7/1983 | Japan . |
| 59-195306 | 11/1984 | Japan . |
| 61-139909 | 6/1986 | Japan . |

OTHER PUBLICATIONS

Proceedings of the International Congress on Transportation Electronics, 10/86, Warrendale Pa., pp. 321-331, Marc Finer.

Primary Examiner—Aristotelis Psitos
Assistant Examiner—Steven R. Garland
Attorney, Agent, or Firm—Antonelli, Terry, Stout & Kraus

[57] ABSTRACT

A helical scan tape apparatus including a first pair of magnetic heads having mutually different azimuth angles disposed on a peripheral face of a rotary drum at an angle interval of 180 degrees so as to oppose each other, a second pair of magnetic heads disposed on of the rotary drum so as to be perpendicular to a disposition direction of the first magnetic heads, a magnetic tape helically wound around the rotary drum so as to extend over an angle of 90 degrees, the tape being moved while the drum is controlled to rotate in synchronism with a reference signal, the first magnetic heads having a wider gap width than a track pitch of tracks recorded on the tape without providing a guard band for enabling azimuth recording of a data signal on the tracks, the data signal being recorded repeatedly into a particular recording area, wherein the first magnetic heads are used substantially for recording and the second magnetic heads are used substantially for reproduction and are positioned with a downward shift in the height direction of the drum equivalent to half of a scanning width of the second magnetic heads as compared with said first magnetic heads. Alternatively, the second magnetic heads may be disposed with a predetermine amount of shift so that an end of said second magnetic heads opposite to a tape traveling direction is located within a track recorded in advance by a predetermined value.

9 Claims, 10 Drawing Sheets

MAGNETIC TAPE MEMORY APPARATUS WITH AXIALLY DISPLACED HEADS ENABLING AFTER RECORDING AND VERIFICATION

BACKGROUND OF THE INVENTION

The present invention relates to a magnetic tape memory apparatus of helical scan scheme for recording digital data, and in particular to such a scheme suitable for rewriting data already recorded.

A magnetic tape apparatus of helical scan type provides a higher recording density than that of a magnetic tape apparatus of fixed head type. Therefore, magnetic tape apparatuses of helical scan type are widely used in fields needing a large quantity of information such as the VTR field. Because of advancement of the VTR technique in recent years, domestic VTRs are produced in large quantities and at reasonable costs and are popularized significantly. Further there is a digital audio tape recorder system (R-DAT) for recording/reproducing PCM signals of music onto/from tape stored in a cassette case. In this DAT, digital signals are recorded. The tape cassette is as small as 73 mm (width) × 54 mm (depth) × 10.5 mm (height) and permits stereophonic sound recording for up to two hours. And the tape cassette has a capacity of approximately 1.4 Gbyte when converted in bytes. The DAT has a search function capable of reproducing and gaining access to tape while running the tape at high speed. Thus the DAT is suitable to use as external memory apparatuses. By using this DAT technique, it is possible to realize an inexpensive magnetic tape memory apparatus having a large capacity. The DAT will now be described. FIG. 1 is a schematic configuration diagram of a tape traveling system. In FIG. 1, numeral 1 denotes a rotating drum, 2a and 2b magnetic heads attached to the drum 1 differing from each other in azimuth angle by ±20 degrees, 3 magnetic tape, 4a, 4b and 4c respectively guide posts, a capstan and a pinch roller included in tape traveling means for winding the tape 3 around the drum 1 and traveling the tape 3, and 5 a tape cassette. The tape 3 is 3.81 mm in width and 13 μm in thickness. With respect to standards, there are several modes depending upon the sampling frequency of A-D conversion, the number of bits per word and the number of channels. However, a standard mode will now be described. The tape 3 is driven by the capstan 4b and the pinch roller 4c at a traveling speed of 8.15 mm/sec. The drum 1 is rotated at 2,000 rpm. While the tape 3 is slantly wound around the drum 1 over a 90 degree range with a lead angle of 22 minutes and 6 degrees to travel by the traveling means 4a, signals are recorded onto/reproduced from the tape by the magnetic heads 2a and 2b. A pattern on recording tracks thus recorded on the tape is shown in FIG. 2. In FIG. 2, numeral 6 denotes a track recorded by the magnetic head 2a and numeral 7 denotes a track recorded by the magnetic head 2b. The track pitch P, the track length L and the recording width $W_R$ are 13.591 μm, 23.501 mm and 2.613 mm, respectively. FIG. 3A shows the recording format on the magnetic tape. One track has 196 blocks. PCM signals comprising 16 bits per word are divided into 8-bit groups (symbols) and recorded. As shown in FIG. 3B, one block includes a datum occupying 32 symbols, a synchronization signal (SYNC) occupying one symbol, an ID code occupying one symbol, a block address occupying one symbol and a parity code occupying one symbol for detecting errors caused in the ID code and the block address. That is to say, one block includes 36 symbols in total. The ID code is a signal for discriminating the sampling frequency, the number of channels and the like of the PCM signal. In one track, 128 blocks of the PCM signal are arranged in a control portion having a tape winding angle of approximately 60 degrees. On both sides of the central portion, a region for recording an ATF signal used for tracking control is provided. Further, on both sides of the ATF signal region, a subcode having 16 blocks is disposed so as to have 8 blocks on each side. In the subcode region, sequence of program, time and the like are recorded. The subcode region has the same block configuration as that of the PCM signal region.

Reliability of data is a very important factor in memory apparatuses of computers. When data are to be recorded in a flexible apparatus or a fixed magnetic disk apparatus, therefore, data to be recorded are first recorded onto a magnetic disk, and the data are then reproduced to confirm that the data are correctly recorded. If there is an error, the data are recorded again or recorded in an alternate sector to perform verification operation. In order to improve the reliability of data, error correction codes are used in the DAT and the PCM recorder. Even if an error which cannot be corrected is caused at a rate of, say, approximately once every 30 minutes, it cannot be said that this error is fatal. Therefore, error correction codes alone suffice and it is not necessary to confirm the recorded data. In case of use as an external memory apparatus of a computer, however, any minute error may be fatal. For avoiding a defect on the magnetic tape and false recording due to an invasion of a foreign substance, therefore, it is indispensable to check whether data are correctly recorded. Further, it is necessary to partially correct data already recorded and write the corrected data at the same location as that of the original data and link data together afterwards to record them. Examples relating to checking whether recording has been correctly performed in the helical scan type and after recording are described in JP-A-58-122606, JP-A-61-139909, and JP-A-59-195306.

In the helical scan type, the magnetic tape travels at a constant velocity. A recording track is formed by adding the velocity vector of the rotating drum to that of the tape. In case continuous recording operation is performed in the conventional magnetic head configuration, the magnetic head automatically moves to the next track, and hence it is not possible to reproduce and confirm the recorded data. It is not desirable to drive the tape intermittently because it not only casts a heavy burden upon the tape drive and control apparatus but also requires start time and stop time. Further, it is also possible to rewind the magnetic tape and then travel the tape again to reproduce data for the purpose of reproducing and confirming the data recorded once. However, it takes a long time to rewind the tape and restart traveling and hence the data confirmation in such a form is not practical. The verifying function is attained by using a composite head comprising a recording head and a reproducing head united in one body and by reproducing immediately after the data recording to compare the recorded contents with the reproduced contents. Since the reproduced signal is weak, however, it is difficult to reproduce data while recording data because of a crosstalk problem.

Therefore, it is necessary to make the distance angle between the recording head and the reproducing head equal to or larger than the recording angle onto the tape (corresponding to the winding angle). In the DAT, azimuth recording is performed. That is to say, data are alternatively recorded on tracks without providing a guard band. In general, the recording width (corresponding to the gap width $W_1$) of the magnetic head is larger than the track pitch P. In the reproduction operation, the amount of off-track is detected by using the above described ATF signal, and a negative feedback closed loop is so configured to control the tape traveling that the center of the gap of the reproducing head in the width direction of the gap may come to the center of the recording track. Since the gap width $W_1$ of the magnetic head is larger than the track pitch P, however, writing operation of data onto one track shaves its preceding and succeeding tracks. Once data have been recorded, therefore, it is difficult to rewrite only one track or only one portion within one track. If a group is constituted by a plurality of tracks and data are rewritten while taking one group as unit, such a problem is solved. If the ATF signal region for tracking control is also rewritten, however, there is a problem that adjacent groups might be eroded in rewriting data many times because of difference between the tape velocity and the rotation velocity of the cylinder and expansion caused by the temperature difference.

SUMMARY OF THE INVENTION

An object of the present invention is to provide a highly reliable magnetic tape memory apparatus free from the above described problem and provide a magnetic tape memory apparatus capable of correctly reproducing data rewritten in after recording operation effected upon an already recorded portion as well without causing disturbance in the tracking control signal over a plurality of groups.

Another object of the present invention is to provide a magnetic tape memory apparatus capable of performing the verifying operation normally in after recording operation as well without reproducing old data recorded with identical azimuth.

The above described object is achieved by making the winding angle of the tape around the rotating cylinder and the recording angle 90 degrees, disposing a first pair of magnetic heads having mutually different azimuth angles on the rotating cylinder at an interval of 180 degrees, disposing a second pair of magnetic heads having mutually different azimuth angles so as to be perpendicular to the first pair of magnetic heads and displaced from the first pair of magnetic heads by half of the scanning track width in the height direction of the cylinder in order to displace the second magnetic heads by half of the scanning track width of the second magnetic heads, constituting a group from a plurality of tracks, performing the data writing/reading operation while taking a group as unit, and rewriting only the data region excepting the ATF region by means of the first magnetic heads while performing tracking control by means of a tracking control signal obtained from the above described ATF signal reproduced by the second magnetic heads when a track is to be rewritten.

In accordance with another aspect of the present invention, the above described object is achieved by making the winding angle of the tape around the rotating cylinder and the recording angle 90 degrees, disposing a first pair of magnetic heads having mutually different azimuth angles on the rotating cylinder at an interval of 180 degrees, disposing a second pair of magnetic heads having mutually different azimuth angles so as to be perpendicular to the first pair of magnetic heads, disposing the second magnetic heads so that ends of them opposite to the tape traveling direction of the scanned track may be located within the first recording track, constituting a group from a plurality of tracks, performing the data writing/reading operation while taking a group as unit, reproducing data by means of the first magnetic heads to detect the start position of the data region while performing tracking control by means of a tracking control signal obtained from the above described ATF signal reproduced by the first or second magnetic heads when a group is to be rewritten, then giving a predetermined amount of offset in tracking control to a signal representing an amount of offtrack discriminated from the tracking control signal to intentionally cause off-track, controlling the scanning track of the first magnetic head so as to make it coincide with the recording track already recorded, and rewriting the data region alone by means of the first magnetic heads without rewriting the tracking control signal region already recorded.

DESCRIPTION OF THE PREFERRED EMBODIMENTS

Illustrated embodiments of the present invention will be described hereinafter.

Figure 4:
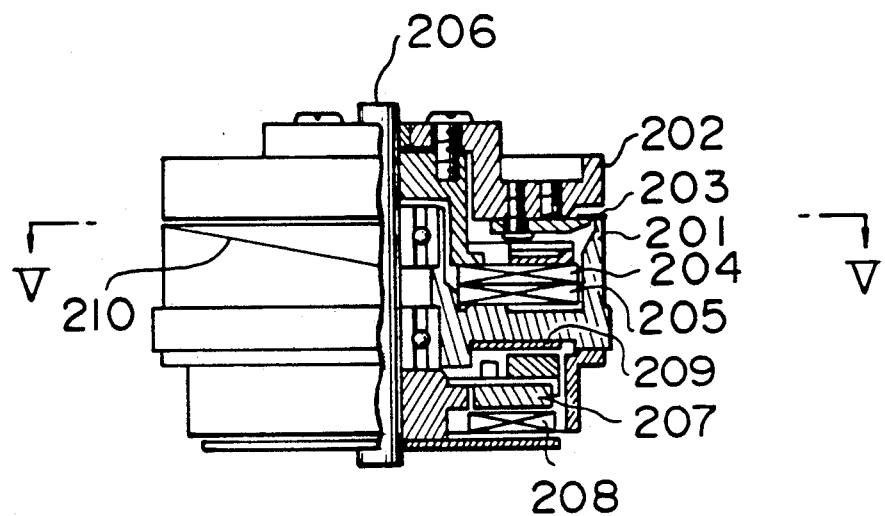
FIG. 4 is a partially broken side view showing the structure of a drum containing a magnetic head used in an embodiment.
Figure 5:
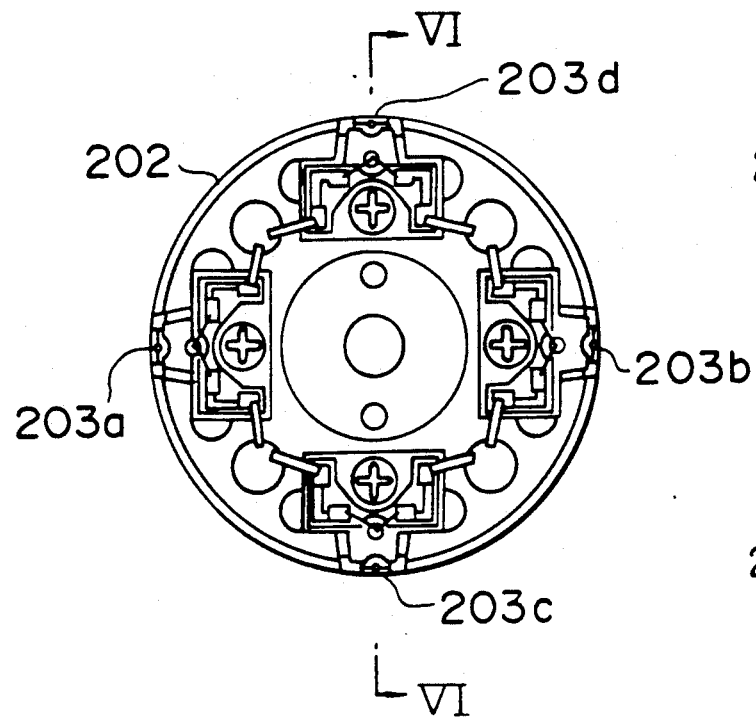
FIG. 5 is a sectional view seen along a line V—V shown in FIG. 4.
Figure 6:
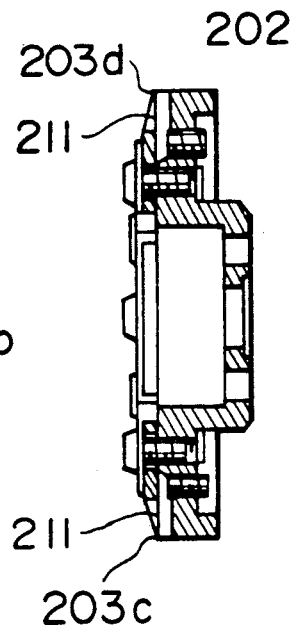
FIG. 6 is a sectional view seen along a line VI—VI shown in FIG. 5.

FIG. 4 is a partially broken side view showing the structure of a drum whereon a magnetic head used in an embodiment of the present invention is mounted. FIGS. 5 and 6 are respectively a top view and a side view showing the structure of a rotating drum whereon the magnetic head is mounted. Numeral 201 denotes a fixed drum, 202 a rotating drum, 203a and 203b first magnetic heads for recording fixed to the rotating drum, and 203c and 203d second magnetic heads for reproduction. Numerals 204 and 205 denote rotary transformers. Numeral 206 denotes a rotating shaft, 207 a magnet which is a rotor of a motor, and 208 a motor rotor coil. Numeral 209 denotes a detection substrate whereon a coil for detecting the number of revolutions of the motor, a Hall device for detecting the rotation phase of the rotor 207 and a Hall device for detecting one pulse signal (hereafter referred to as tach pulse) per revolution of the motor are mounted. Numeral 210 denotes a reed for helically winding magnetic tape around the fixed drum 201. The rotating drum 202 is fixed to the rotating shaft 206. As shown in FIG. 5, the magnetic heads 203a, 203b, 203c and 203d are disposed around the rotation axis of the rotating drum 202 at intervals of 90 degrees in the peripheral direction. The magnetic heads 203a and 203b are disposed on the outer peripheral face of the rotating drum 202 so as to have zero mutual level difference between the lower ends of the head gaps in the rotation axis direction. The magnetic heads 203c and 203d are similarly disposed on the outer pheriphery face of the rotating drum 202 so as to have zero mutual level difference between the lower ends of the head gaps in the rotation axis direction. (Deviation of the lower ends of the head gaps is hereafter referred to as level difference.) The magnetic heads 203a and 203c, and 203b and 203d respectively have the same azimuth values of ±20 degrees. Assuming that the traveling speed of the tape is u m/sec, the rotation speed of the magnetic head (i.e., the peripheral speed of the drum) v m/sec, the number of revolutions of the drum n rpm, the lead angle $\alpha$ degrees and the spacing angle of the magnetic head $\beta$ degrees, the track angle $\theta$ degrees, the relative velocity V between the magnetic head and the tape, and the track pitch P are represented as $$V = \sqrt{(v^2 + n^2 - 2uv\cos\alpha)}$$

$$\theta = \tan^{-1}(v\sin\alpha/(v\cos\alpha - u))$$

$$P = \beta u \sin\theta / 6n.$$

As shown in FIG. 6, the magnetic heads 203c and 203d are attached onto the rotating drum 202 via spacers 211. The indexing angle of each head with respect to the rotating drum 202 is 90 degrees. When the level differences on the outer peripheral face of the rotating drum 202 in the rotation axis direction between the magnetic heads 203a and 203b and between the magnetic heads 203c and 203d are zero, therefore, the magnetic heads 203c and 203d scan the data with a shift equivalent to half of the track pitch as compared with the recording track of the magnetic heads 203a and 203b. The gap width of the magnetic heads 203a and 203b is equal to that of the magnetic heads 203c and 203d and is equivalent to approximately 1.5 times the track pitch.

Figure 7:
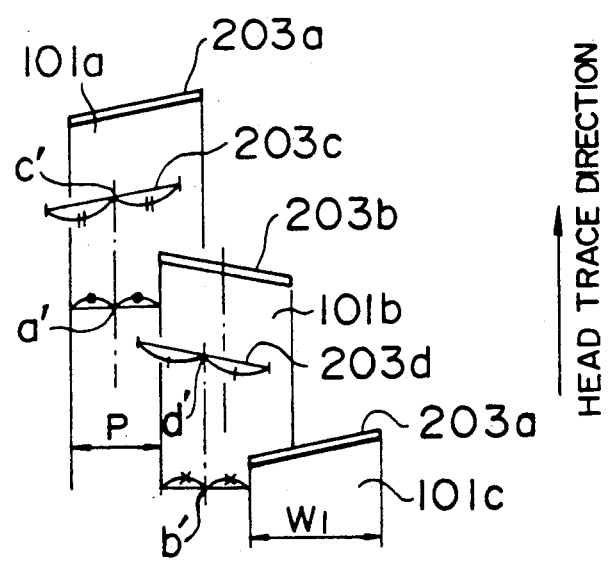
FIG. 7 is a diagram for explaining the track scanning of respective magnetic heads in the embodiment.

FIG. 7 shows the position relationship of the magnetic heads 203a, 203b, 203c and 203d with respect to the scanning track. If there is a level difference between the magnetic heads, the amount of level difference becomes the shift of the scanning pitch of the magnetic head. If the magnetic heads 203c and 203d are mounted to be lower in the axis direction of the rotating drum 202 than the magnetic heads 203a and 203b with a shift equivalent to half of the scanning gap width $W_1$ by adjusting the spacer 211, therefore, the center c' of the gap of the magnetic head 203c as shown in FIG. 7 coincides with the center a' of a recording track left after a track recorded by the magnetic head 203a preceding the magnetic head 203c is overwritten by the next recording head, i.e., the magnetic head 203b.

Figure 8:
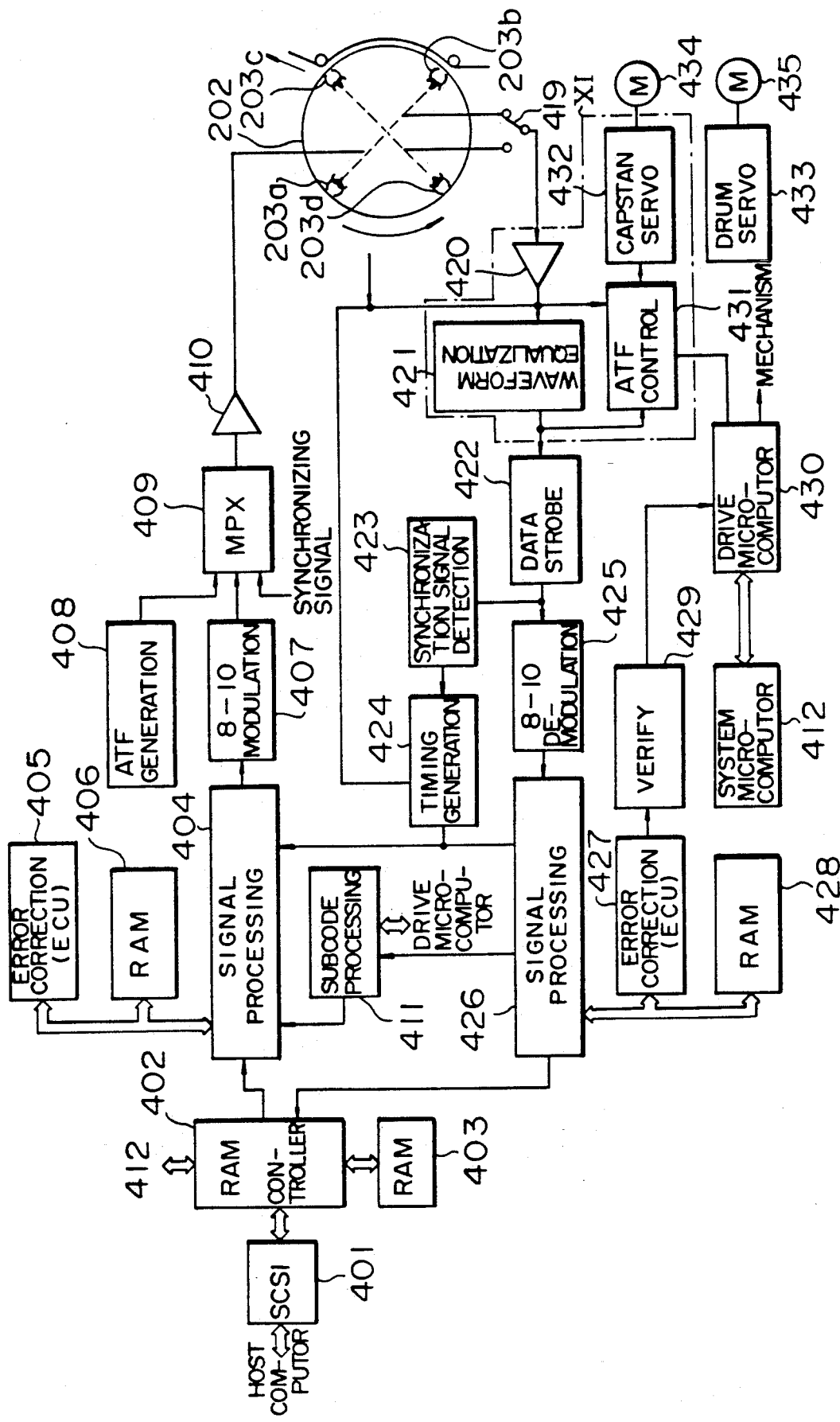
FIG. 8 is a system block diagram of the apparatus.

FIG. 8 is a system block diagram of a whole apparatus of an embodiment including the heads shown in FIGS. 4, 5 and 6.

Figure 1:
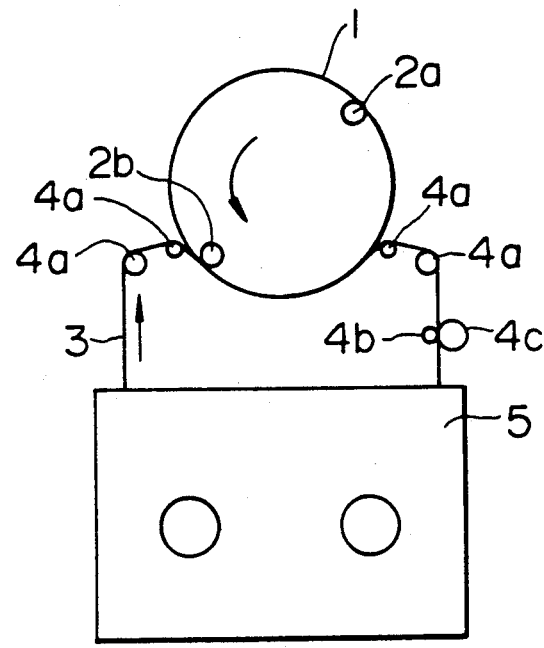
FIG. 1 is a schematic view showing the path along which a conventional DAT is guided to travel.
Figure 2:
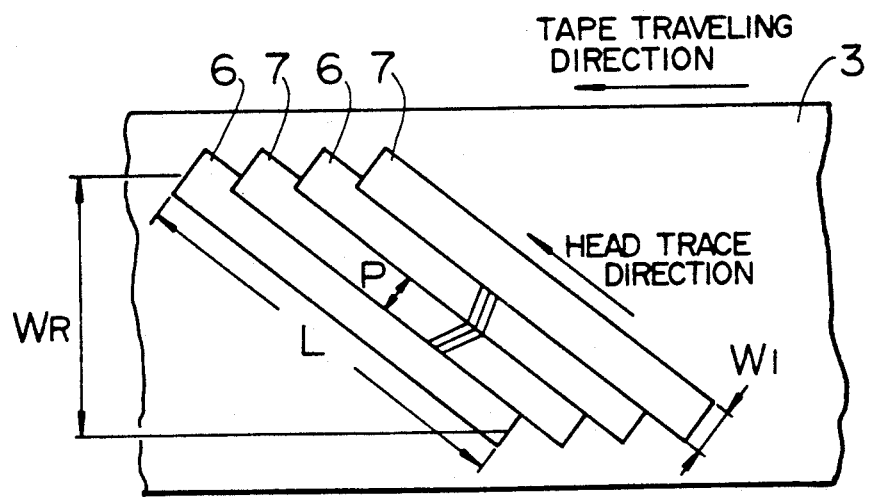
FIG. 2 is a track pattern diagram of the conventional DAT.
Figure 3A:
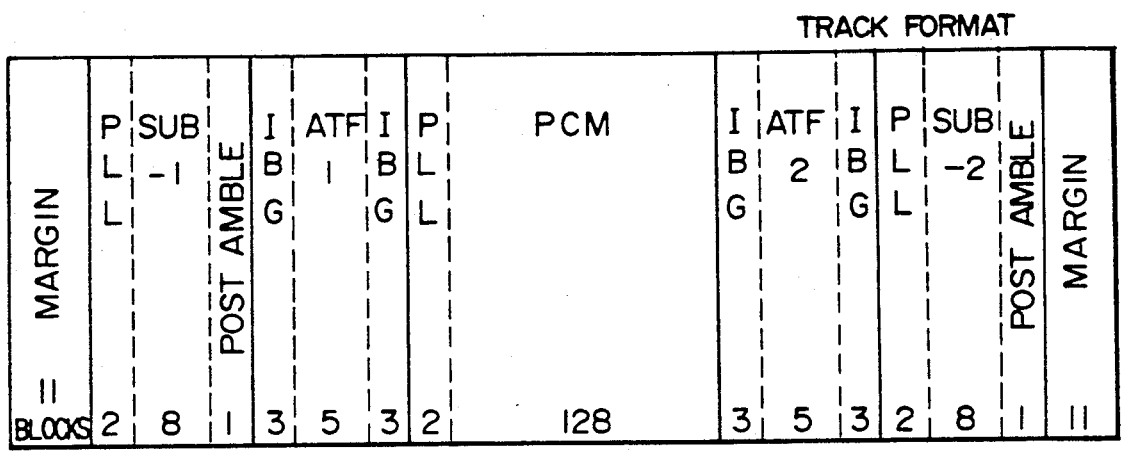
FIGS. 3A and 3B are recording format diagrams of the conventional DAT.
Figure 3B:
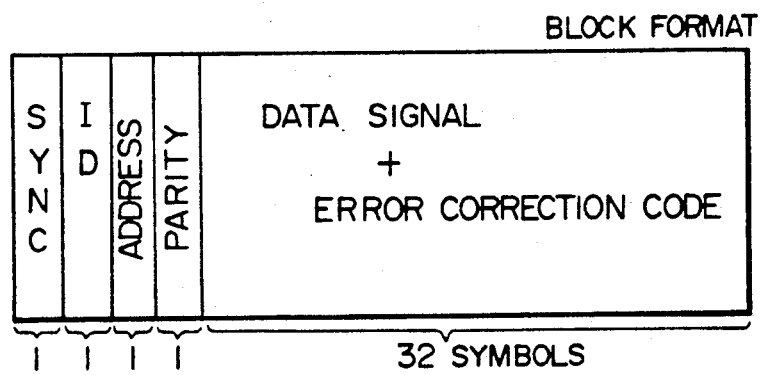

A host computer which is not illustrated is connected to SCSI (small-size computer system interface) 401. In recording operation, a RAM controller 402 controlled by a system microcomputer 412 stores data sent from the host in a RAM 403 temporarily. A signal processing circuit reads out again the data thus stored. An error correction circuit 405 generates an error correction code. The signal processing circuit 404 stores the data signal and the error correction code into a RAM 406. The error correction code is a doubly encoded Reed Solomon Code in the same way as a conventional DAT. In accordance with a recording format, the signal processing circuit 404 reads out the data signal, the error correction code and subcode data generated by a subcode processing circuit 411. After predetermined modulation has been applied, a tracking control signal generated by an ATF generation circuit 408 and a synchronization signal are added to the modulated signal in a multiplexer 409. The resultant signal is recorded onto magnetic tape 413 via a recording amplifier 410 and a rotary transformer by the magnetic heads 203a and 203b. The recording format is based upon the recording format of the conventional DAT shown in FIGS. 3A and 3B. Data are recorded into a PCM signal region, and a group number, a frame number and the like which will be described later are recorded into a subcode region. The rotating drum 202 is controlled in velocity on the basis of the detected number of revolutions and controlled in phase so that the tach pulse may be synchronized to a reference signal. The rotating drum 202 is controlled to rotate at a constant velocity by a drum servo circuit 433. The tape 413 is also controlled to rotate at a constant velocity by a capstan servo circuit 432. The tape 413 is driven by a capstan motor 434 to travel at a constant speed. Data are recorded onto the tape by the magnetic heads 203a and 203b on the basis of the tach pulse. Immediately after data have been recorded, a verifying circuit 429 reproduces the data by using the magnetic heads 203c and 203d and verifies whether data have been correctly recorded. Although the verification is performed by taking a group described later as unit, it will not be described because it does not directly relate to the present invention.

In reproduction operation, the signal reproduced by the magnetic heads 203c and 203d is fed back to the capstan motor 434 on the basis of the ATF signal for tracking control recorded at both ends of the data signal. While tracking servo is thus being performed, the signal is reproduced. The reproduced signal is amplified in a reproduction amplifier 420. The deterioration of characteristics of the reproduced signal caused in the short wavelength region of the magnetic head and the magnetic tape is compensated in a waveform equalization circuit 421. The resultant signal is supplied to a data strobe circuit 422 to produce the data and clock. On the basis of this signal, the synchronization signal is detected and the timing signal is generated in a synchronization signal detection circuit 423 and a timing signal generation circuit 424. In a demodulation circuit 425, data are demodulated. A signal processing circuit 426 performs operation of error detection and correction by using an error correction circuit 427. After the corrected data signal is stored in the RAM 403, it is sent to the host computer via the SCSI interface.

The recording, reproducing and rewriting operation using the above described system will now be described.

When data are to be newly recorded, data are recorded by one 203a (203b) of the first magnetic heads as shown in FIG. 7. An immediately preceding recording track is then reproduced by one 203c (203d) of the second magnetic heads having the same azimuth angle. While checking whether data are correctly recorded, data are successively recorded by the first magnetic head 203a (203b). Since the gap width $W_1$ of the magnetic head is larger than the track pitch P, the recorded width is overwritten by an amount corresponding to the difference between the gap width $W_1$ and the track pitch P when the next track is recorded. Since the above described second magnetic heads 203c and 203d are mounted with a shift equivalent to half of the gap width W of the second magnetic heads in the height direction of the rotating cylinder as compared with the first magnetic heads 203a and 203b, centers c' and d' of the gaps 203c and 203d of the second magnetic heads coincide with centers a' and b' of recording tracks which are left after recording tracks 101a and 101b recorded by the first magnetic head 203a and 203b preceding the gaps 203c and 203d are overwritten by the next recording heads 203b and 203a. In the reproduction operation, a signal based upon a signal representing the amount of off-track obtained from the ATF region is fed back to the capstan motor for traveling and driving the tape to control the rotation of the capstan motor. Tracking control is thus performed so that the gap centers c' and d' of the second reproducing magnetic heads 203c and 203d may coincide with centers of the recording tracks 101a and 101b.

Figure 9A:
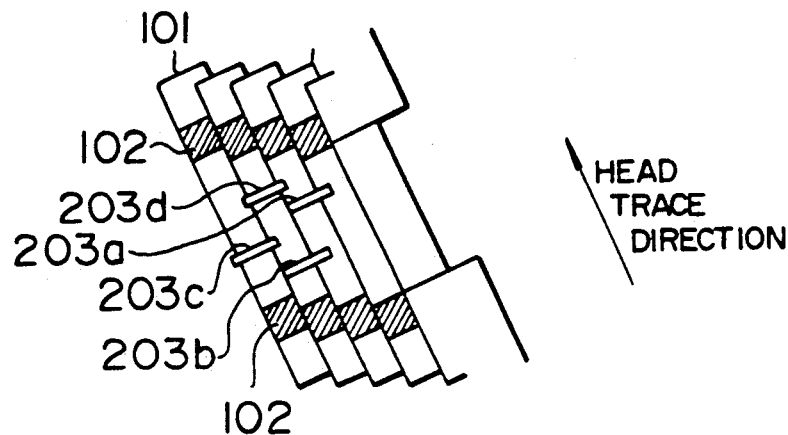
FIGS. 9A, 9B and 9C are diagrams for explaining the after recording operation.
Figure 9B:
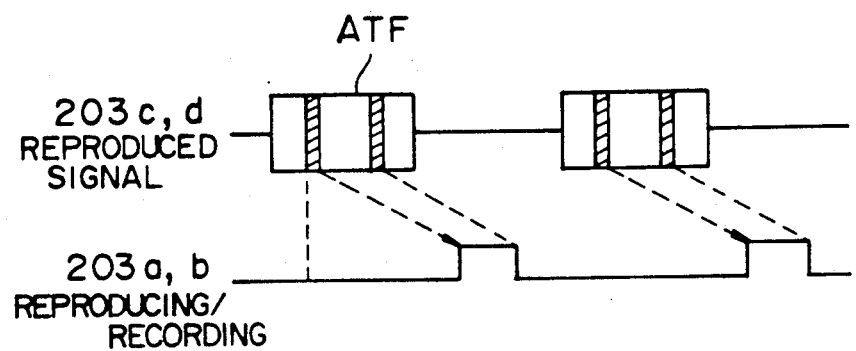
Figure 9C:
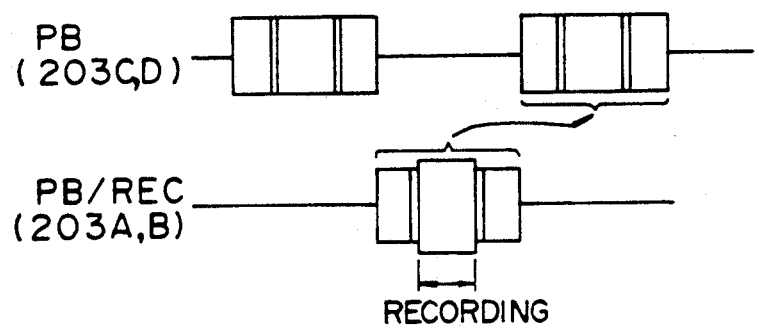

Further, the operation of rewriting the already recorded data, i.e., so-called after recording operation is shown in FIGS. 9A, 9B and 9C.

When a group is to be rewritten, the second magnetic heads 203c and 203d performs the reproduction to effect the tracking control, and the first succeeding magnetic heads 203a and 203b do not perform the tracking control but record only the data region with the exception of the ATF region. The second magnetic heads 203c and 203d are positioned at centers of the recording tracks by tracking control. And the space between them and gap centers of the second magnetic heads 203c and 203d and the succeeding first magnetic heads 203a and 203b are represented by the above described equation. Therefore, the recording track which has been rewritten matches with the ATF region which has not been rewritten. And the center of the recording track which has been rewritten coincides with the track center obtained from the ATF signal.

At this time, the sequence of trace is represented as 203a→203c→203b→203d→203a- - - - - -. While signals are reproduced by the reproducing magnetic heads 203c and 203d to effect the tracking servo, signals are recorded into a portion corresponding to the data region by the recording magnetic heads 203a and 203b at timing delayed as compared with the reproduced signal by 90 degrees as shown in FIG. 9B. Gaps of the reproducing magnetic heads 203c and 203d are positioned at centers of the recording tracks in the width direction by tracking servo. Left ends of the gaps 203a and 203b of the recording magnetic heads coincide with left ends of the recording tracks in the width direction. FIG. 9C shows another embodiment. While signals are reproduced by the magnetic heads 203c and 203d to effect tracking servo, signals are reproduced by the magnetic heads 203a and 203b, and the terminating end of the tracking control signal region is detected to record the data region alone. From the reproduced signals of the magnetic heads 203a and 203b, the start point of the data region is detected in the timing generation circuit 424 to rewrite the data region. Since in this case the start point of the data region is detected while the track itself to be rewritten is reproduced, the shift of the region can be advantageously reduced.

Another configuration example of a magnetic tape recording apparatus of helical scan type according to the present invention will now be described by referring to FIGS. 10, 11 and 12.

In the structure of a cylinder used in this configuration example, the second magnetic heads 203c and 203d for reproduction in the drum shown in FIGS. 4, 5 and 6 are so disposed that the ends of their scanning tracks opposite to the tape traveling direction may be positioned within a track recorded by the first recording magnetic heads 203a and 203b which precedes the second magnetic heads by 90 degrees.

In the configuration of FIGS. 4, 5 and 6, the second magnetic heads are mounted with a shift equivalent to half of the scanning track width of the first magnetic heads in the height direction of the cylinder as compared with the first magnetic heads 203a and 203b, and adjustment is performed so that the center of the track pitch width may coincide with the center of the gap width of the second magnetic heads 203c and 203d for reproduction as already described. In the present configuration example, however, the second magnetic heads are mounted with a predetermined amount of shift by using the spacer 211 so that the end of the second magnetic heads 203c and 203d opposite to the tape traveling direction may be located within the track recorded in advance by a predetermined value. Other portions are similar to those of the above described cylinder configuration. Further, the system blocks are also constructed in the same way as those of FIG. 8 with the exception of altered portion which will be described later. Accordingly, identical portions will not be described.

Figure 10:
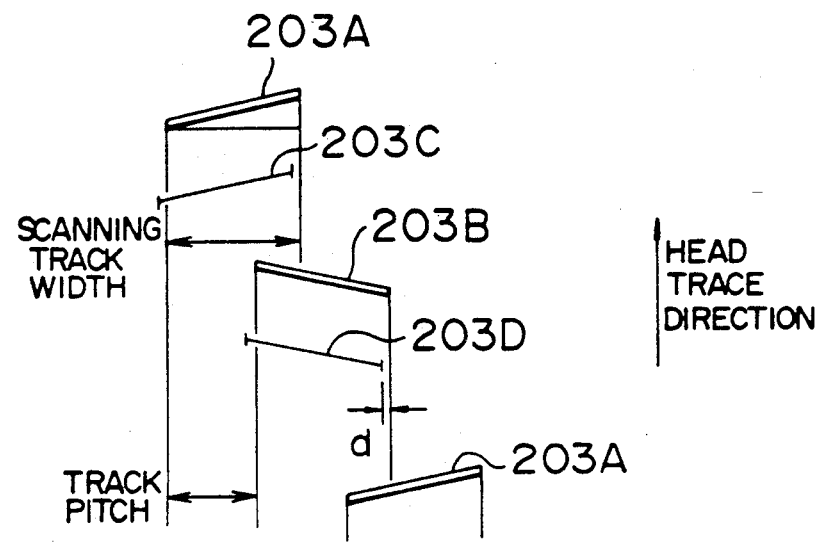
FIG. 10 is a trace locus diagram of a magnetic head in another configuration example.

FIG. 10 shows position relationship among scanning track loci of respective magnetic heads after such adjustment that the track end of one of the second heads 203c and 203d is positioned inside the preceding first track by a predetermined value d.

Figure 11:
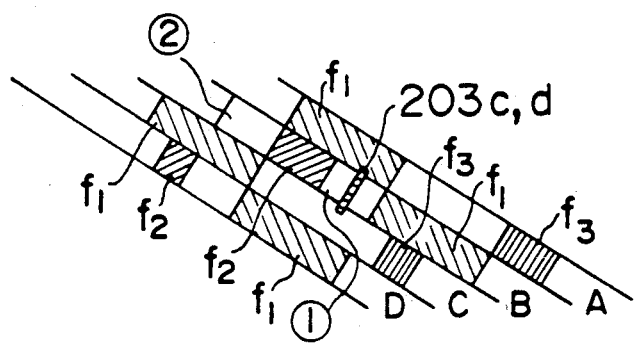
FIG. 11 is a recording format diagram of a tracking control signal showing the tracking scheme of another embodiment.

FIG. 11 is a configuration diagram of the tracking control signal (ATF signal) area. An ATF signal comprises signals having three frequencies, i.e., f1=130 kHz, f2=522 kHz and f3=784 kHz. The ATF signal is complete in four tracks. The signal f1 is a pilot signal for deriving a tracking error signal, and f2 and f3 are synchronization signals for deriving the detection points of the pilot signal. One out of a pair of magnetic heads records and reproduces f2, whereas the other records and reproduces f3. The tracking operation will now be described. It is now assumed that the magnetic heads 203c and 203d are reproducing track B. At time ① when the synchronization signal f2 is detected, the crosstalk level of the pilot signal f1 on track A is detected and held. At time ② delayed from the time ① by a time corresponding to two blocks, the crosstalk level, of the pilot signal on track C is detected and held. A tracking error signal comprising the difference between values held at ① and ② is thus obtained. If a magnetic head travels under the state that it is biased toward the A track side, for example, the level of the pilot signal f1 at the point ① becomes large. Accordingly, the velocity of the capstan motor is so controlled that the level difference of the pilot signal f1 between the points ① and ② may become zero, resulting in accurate tracking. FIG. 12 is a configuration diagram of a control circuit for performing the above described tracking operation and corresponds to portion XI surrounded by a broken line in FIG. 8. A signal supplied from the magnetic heads 203c and 203d is amplified in a reproduction amplifier 420, and thereafter synchronization signals f2 and f3 are extracted in a bandpass filter 701. The synchronization signals f2 and f3 are detected in a synchronization signal detection circuit 702, and a reference signal is sent to a timing generation circuit 703. On the basis of this signal, timing signals S1 and S2 corresponding to the points ① and ② described by referring to FIG. 11 are generated in the timing generation circuit 703 and sent to a hold curcuit 704. On the other hand, only the pilot signal f1 is extracted in a low-pass filter 705, and the amplitude level of the pilot signal is detected in an envelope detection circuit 706 and supplied to the hold circuit 704. In the hold circuit 704, the amplitude level of the pilot signal is held at timing S1 and S2. Succeedingly, a signal corresponding to the difference between two held values is detected in a difference detection circuit 707 and supplied to a differential amplifier 708 for adding an offset. A switch circuit 709 is connected to the other input terminal of the differential amplifier 708 to apply voltage of a desired value to the differential amplifier. The output of the differential amplifier 708 is supplied to a capstan motor control circuit 432 as an error signal. Depending upon the error signal, the control voltage of the capstan motor is controlled. And a negative feedback loop is so constructed that the output signal of the difference detection circuit 707 may become equal to the desired value. Tracking control is thus performed. It is possible to provide an arbitrary off-track by changing the voltage of desired value. In reproduction operation, the switch circuit 709 is so connected that the detected difference output may become zero. In the after recording operation, the differential amplifier is connected to voltage of a desired value causing such an offset that the left ends of gaps of the magnetic heads 203a and 203b coincide with edges of recording tracks.

Figure 12:
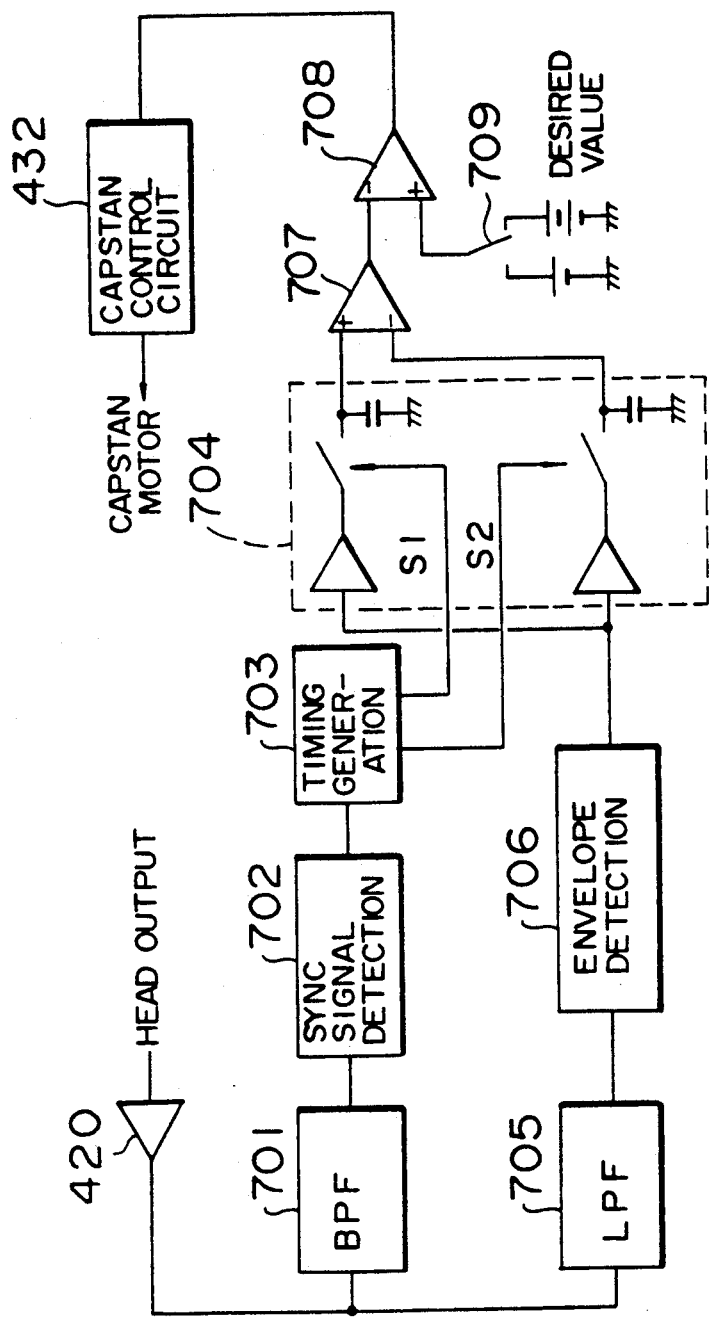
FIG. 12 is the block configuration diagram of a tracking control system for performing tracking of the scheme shown in FIG. 10.

In the configuration example shown in FIGS. 10, 11 and 12, track servo is performed by using the magnetic heads 203c and 203d. However, track servo may be performed by using the magnetic heads 203a and 203b.

Further in the present embodiment, the magnetic heads 203c and 203d are used in the reproduction operation. However, the magnetic heads 203a and 203b may be used alternatively.

In the after recording operation, signals are reproduced by the magnetic heads 203c and 203d or the magnetic heads 203a and 203b to perform the above described tracking control. At the same time, the switch circuit 419 is switched to the magnetic heads 203a and 203b to perform reproduction. The start position of the data region is detected by the synchronization signal detection circuit 423 and the timing generation circuit 424, and the data signal is recorded by the magnetic heads 203a and 203b. The switch circuit 419 is controlled by the timing generation circuit 424.

That is to say, signals are reproduced by the second magnetic heads 203c and 203d to effect tracking servo provided with offset, and the first magnetic heads 203a and 203b are so controlled that their left ends may coincide with a track to be recorded. The track to be recorded is reproduced by the magnetic heads 203a and 203b. The start position of the data region is detected, and only the data region is recorded.

Figure 13:
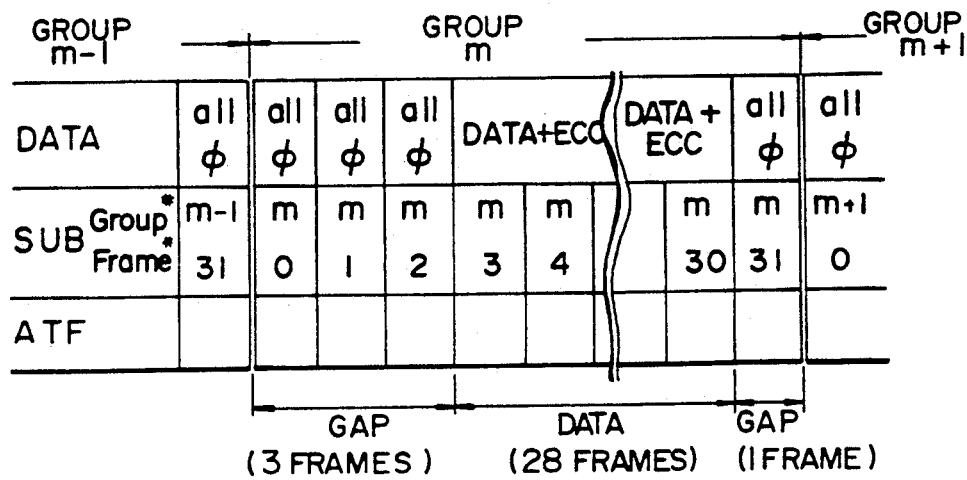
FIG. 13 is a configuration diagram showing the group configuration of data.
Figure 14A:
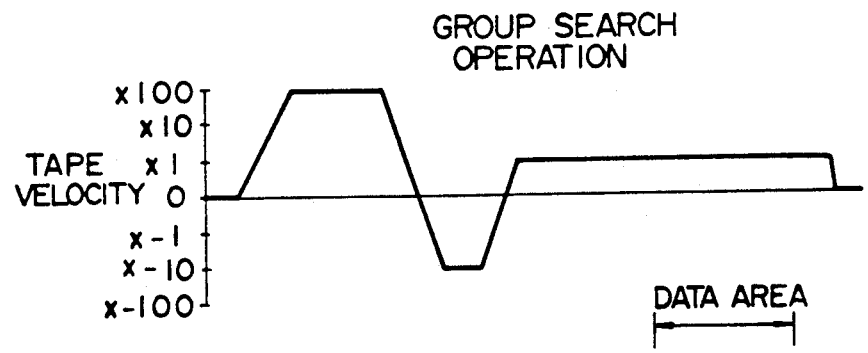
FIGS. 14A, 14B and 14C are diagrams for explaining the after recording operation.
Figure 14B:
Figure 14C:
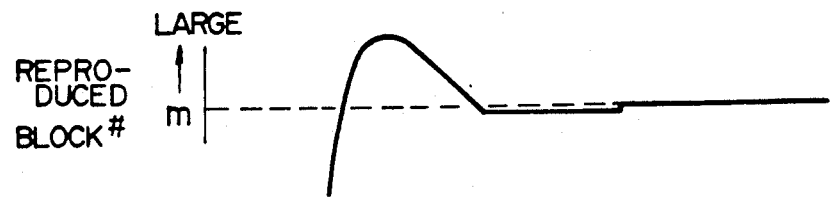

FIG. 13 shows the configuration of a group comprising a plurality of tracks used in the present invention. In the present embodiment, one group comprises 64 tracks and has an amount of information of 128 kbytes. In data regions of three top frames and one tail frame of each block, all-zero data are recorded. The all-zero data form a gap for absorbing disturbance of matching caused between blocks when after recording or link recording is performed by taking a group as unit. The operation for rewriting a group of already recorded tape will now be described. FIGS. 14A, 14B and 14C are diagrams for explaining the operation performed when a desired block is searched. FIGS. 14A, 14B and 14C show the tape velocity, the signal reproduced by the magnetic heads 203c and 203d and the reproduced group number. The search operation is performed by effecting control so that the relative velocity between the tape and the head may become equal to that of normal reproduction operation while traveling the tape at high speed. Since the search operation does not directly relate to the present invention, however, its description will be omitted. The reproduction operation is entered from a group immediately preceding or preceding a desired group. Until a group immediately preceding the desired group is reached, pull-in operation of tracking servo is completed. When the desired group is reached, the timing generation circuit 424 of FIG. 8 generates a recording gate by delaying the signal reproduced by the magnetic heads 203c and 203d by an amount corresponding to the space between the recording head and the reproduction head, i.e., 90 degrees. Recording is started at a portion of ATF1 of the ATF region in the recording format shown in FIG. 3A, which corresponds to the tail end of IBG. Only the data region is overwritten to be rewritten. At this time as well, the verifying operation described before is performed. The tracking control is performed by using the magnetic heads 203c and 203d. While recording is performed, the tracking error signal is held. Since the winding angle of the tape around the drum is 90 degrees and the indexing angle of the magnetic heads is also 90 degrees, two magnetic heads are simultaneously in contact with the tape for an extremely short time, the problem of crosstalk being not posed. Scanning tracks of respective magnetic heads are shown in FIG. 7. When the magnetic head 203c, for example, is on track as a result of tracking control, therefore, the gap edge of the succeeding magnetic head 203b coincides with the edge of the recording track already recorded. As a result, the track center of the data region after rewriting operation coincides with the track center obtained from the ATF signal. Because of a positioning error in tracking control and mounting precision between drives of the magnetic heads, there might be a shift between the track center of the data region and the track center obtained from the ATF signal as a result of rewriting operation. Since the mounting position of each magnetic head with respect to the drum is precisely adjusted, however, hindrance is not caused. Since the scanning track width of the magnetic head is larger than the track pitch at the last track of the group, the next recording track is shaved. Since this track is a gap track, however, hindrance is not caused in the reproduction operation performed thereafter. Further in a track rewritten first, the preceding recording track might be partially unerased. However, it is evident that hindrance is not caused because the track is a gap track.

Figure 15:
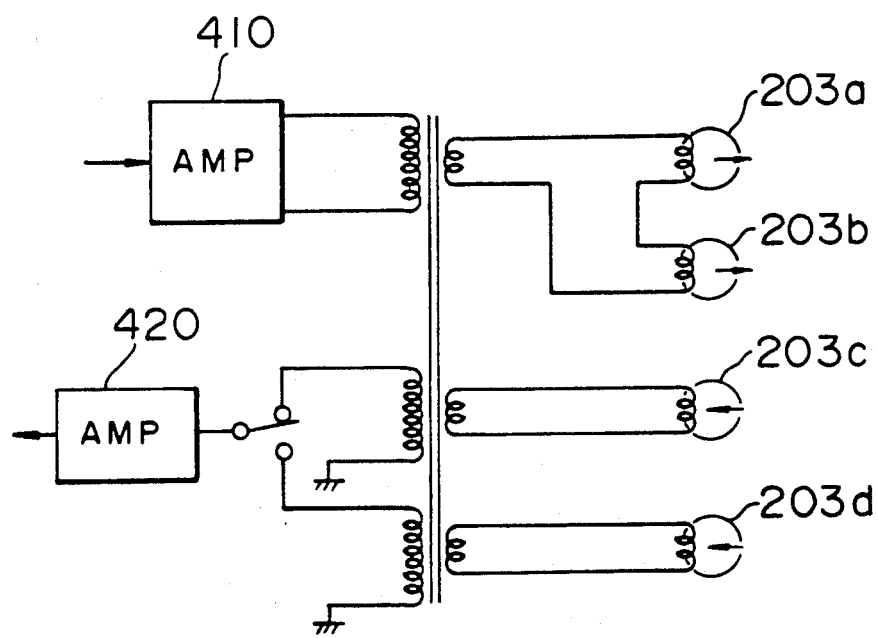
FIG. 15 is a connection diagram between a rotary head used in an embodiment.

FIG. 15 shows an embodiment of a rotary transformer of the present apparatus. As described above, the magnetic heads 203a and 203b are used exclusively for recording, and the magnetic heads 203c and 203d are used exclusively for reproduction. Therefore, the magnetic heads for recording are connected in series for one channel of the rotary transformer. If a rotary transformer having four channels is housed in a drum having diameter of 30 mm, the transfer efficiency in the transformer is lowered, resulting in a lowered quality of reproduced signals. Since the rotary transformer has only three channels in the present embodiment, it is possible to minimize the degradation in transfer efficiency of the rotary transformer caused by an increase in the number of heads.

When an already recorded portion undergoes after recording in the present embodiment heretofore described, it is possible in tracking control to rewrite only the data signal region so that the track center indicated by the tracking control signal may coincide with the center of the recording track obtained after rewriting operation without changing the operation performed in reproduction. Therefore, data after rewriting operation can also be correctly reproduced without causing disturbance of the tracking control signal over a plurality of groups. Further, four magnetic heads may comprise heads having identical scanning track width. Further, each magnetic head is used exclusively for recording or reproduction. Accordingly, it is also possible to optimize each gap length to perform recording/reproduction with high quality and improve the reliability.

When an already recorded portion undergoes after recording in the different embodiment, only the data signal region is so rewritten that the track center indicated by the tracking control signal may coincide with the center of the recording track obtained after the rewriting operation by performing the tracking control with an offset. Therefore, the data after rewriting operation can be correctly reproduced without causing disturbance of the tracking control signal over a plurality of groups.

When all regions are newly recorded onto an already recorded tape, the gap of the reproducing head is located inside the track. Therefore, old data recorded with identical azimuth are not reproduced. In this case as well, the verifying operation can be normally performed.

We claim:

1. A magnetic tape memory apparatus using a helical scan scheme including a first pair of magnetic heads having mutually different azimuth angles disposed on a peripheral face of a rotary drum at an angle interval of 180 degrees so as to oppose each other, a second pair of magnetic heads disposed on the peripheral face of the rotary drum so as to be perpendicular to a disposition direction of said first magnetic heads, a magnetic tape helically wound around the rotary drum so as to extend over an angle of 90 degrees, said tape being traveled while said rotary drum is controlled to rotate in synchronism with a reference signal, said first magnetic heads having a wider gap width than a track pitch of tracks recorded on said tape without providing a guard band for enabling azimuth recording of a data signal on said tracks, the data signal being recorded repeatedly into a particular recording area, wherein said first magnetic heads are used substantially for recording and said second magnetic heads are used substantially for reproduction and are positioned with a downward shift in the height direction of said drum equivalent to half of a scanning width of said second magnetic heads as compared with said first magnetic heads;

delay means for producing a record start timing signal for a data region in a following track from a signal reproduced by said second magnetic heads;

a group is formed by a plurality of said tracks, and recording data are read and written by taking said group as a unit; and when data already recorded on said tracks are to be rewritten, only said first magnetic heads in response to said delay means effects rewriting of said group by rewriting only the data region while performing a reproduction operation by said second magnetic heads.

2. A magnetic tape memory apparatus according to claim 1, wherein said delay means generates said record start timing signal in accordance with a rotation synchronization signal of said drum.

3. A magnetic tape memory apparatus according to claim 1, wherein said first magnetic heads are heads used for both recording and reproduction, and when already recorded data are to be rewritten, said first magnetic heads detect a terminal end of a tracking control signal region and rewrite the date region alone while tracking and reproduction operations are performed by using said second magnetic heads.

4. A magnetic tape memory apparatus according to claim 1, wherein said first pair of magnetic heads are arranged in one channel.

5. A magnetic tape memory apparatus using a helical scan scheme including a first pair of magnetic heads having mutually different azimuth angles disposed on a peripheral face of a rotating drum at an angle interval of 180 degrees so as to oppose each other, a second pair of magnetic heads disposed on the peripheral face of the rotating drum so as to be perpendicular to a disposition direction of said first magnetic heads, a magnetic tape helically wound around the rotating drum so as to extend over an angle of 90 degrees, said tape being traveled while said rotating drum is controlled to rotate in synchronism with a reference signal, said first magnetic heads having a wider gap width than a track pitch of tracks recorded on said tape without providing a guard band for enabling azimuth recording on said tracks, a data signal being recorded repeatedly into a particular recording area, wherein said first magnetic heads are used substantially for recording and said second magnetic heads are used substantially for reproduction and are positioned with a downward shift of a predetermined amount in the height direction of said drum as compared with said first magnetic heads;

delay means for detecting a start timing signal of a data signal region from a signal reproduced by said second magnetic heads;

means for supplying an offset to a signal representing an amount of off-track discriminated from a tracking control signal read out from a recording track;

a group is formed by a plurality of said tracks, and recorded data are read and written by taking said group as a unit; and when already recorded data are to be rewritten, said tracking control signal is reproduced by said second magnetic heads to control tracking so that a tracking scanning position of said first magnetic heads may coincide with a recording track already recorded in accordance with said means for supplying an offset, and only the data signal region is rewritten by said first magnetic heads in response to said delay means.

6. A magnetic tape memory apparatus according to claim 5, wherein tracking control having said off-track is performed by said first magnetic heads.

7. A magnetic tape memory apparatus according to claim 5, wherein said first pair of magnetic heads are arranged in one channel.

8. A magnetic tape memory apparatus using a helical scan scheme including a first pair of magnetic heads having mutually different azimuth angles disposed on a peripheral face of a rotary drum at an angle interval of 180 degrees so as to oppose each other, a second pair of magnetic heads disposed on the peripheral face of the rotary drum so as to be perpendicular to a disposition direction of said first magnetic heads, a magnetic tape helically wound around the rotary drum so as to extend over an angle of 90 degrees, said tape being traveled while said rotary drum is controlled to rotate in synchronism with a reference signal, said first magnetic heads having a wider gap width than a track pitch of tracks recorded on said tape without providing a guard band for enabling azimuth recording of a data signal on said tracks, the data signal being recorded repeatedly into a particular recording area, wherein said first magnetic heads are used substantially for recording and said second magnetic heads are used substantially for reproduction are disposed with a predetermined amount of shift so that an end of said second magnetic heads opposite to a tape traveling direction is located within a track recorded in advance by a predetermined value;

delay means for producing a record start timing signal for a data region in a following track from a signal reproduced by said second magnetic heads;

a group is formed by a plurality of said tracks, and recording data are read and written by taking said group as a unit; and when data already recorded on said tracks are to be rewritten, only said first magnetic heads in response to said delay means effects rewriting of said group by rewriting only the data region while performing a reproduction operation by said second magnetic heads.

9. A magnetic tape memory apparatus using a helical scan scheme including a first pair of magnetic heads having mutually different azimuth angles disposed on a peripheral face of a rotating drum at an angle interval of 180 degrees so as to oppose each other, a second pair of magnetic heads disposed on the peripheral face of the rotating drum so as to be perpendicular to a disposition direction of said first magnetic heads, a magnetic tape helically wound around the rotating drum so as to extend over an angle of 90 degrees, said tape being traveled while said rotating drum is controlled to rotate in synchronism with a reference signal, said first magnetic heads having a wider gap width than a track pitch of tracks recorded on said tape without providing a guard band for enabling azimuth recording on said tracks, a data signal being recorded repeatedly into a particular recording area, wherein said first magnetic heads are used substantially for recording and said second magnetic heads are used substantially for reproduction and are disposed with a predetermined amount of shift so that an end of said second magnetic heads opposite to a tape traveling direction is located within a track recorded in advance by a predetermined value;

delay means for detecting a start timing signal of a data signal region from a signal reproduced by said second magnetic heads;

means for supplying an offset to a signal representing an amount of off-track discriminated from a tracking control signal read out from a recording track;

a group is formed by a plurality of said tracks, and recorded data are read and written by taking said group as a unit; and when already recorded data are to be rewritten, said tracking control signal is reproduced by said second magnetic heads to control tracking so that a tracking scanning position of said first magnetic heads may coincide with a recording track already recorded in accordance with said means for supplying an offset, and only the data signal region is rewritten by said first magnetic heads in response to said delay means.

* * * * *